United States Patent
Choudhury

(10) Patent No.: US 7,102,341 B1
(45) Date of Patent: Sep. 5, 2006

(54) APPARATUS FOR CONTROLLING A POWER FACTOR CORRECTION CONVERTER DEVICE

(75) Inventor: Shamim A. Choudhury, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/094,094

(22) Filed: Mar. 30, 2005

(51) Int. Cl.
*G05F 1/40* (2006.01)

(52) U.S. Cl. .................. 323/285; 323/222; 323/284
(58) Field of Classification Search ............... 323/222, 323/223, 265, 282–285, 351; 363/89, 125
See application file for complete search history.

(56) References Cited

U.S. PATENT DOCUMENTS

| | | | |
|---|---|---|---|
| 5,278,490 A | 1/1994 | Smedley | |
| 6,249,108 B1 | 6/2001 | Smedley et al. | |
| 6,781,352 B1* | 8/2004 | Athari et al. | 323/222 |
| 2003/0222633 A1* | 12/2003 | Hwang | 323/282 |

OTHER PUBLICATIONS

"AND8124/D 90W, Universal Input, Single Stage, PFC Converter"; Semiconductor Components Industries, LLC, 2003; Dec. 2003—Rev. 4; Publication Order No. AND8124/D; http://onsemi.com.

"AND8147/D An Innovative Approach to Achieving Single Stage PFC and Step-Down Conversion for Distributive Systems"; Semiconductor Components Industries, LLC, 2004; Feb. 2004—Rev. 0; Publication Order No. AND8147/D; http://onsemi.com.

* cited by examiner

*Primary Examiner*—Gary L Laxton
(74) *Attorney, Agent, or Firm*—W. James Brady, III; Frederick J. Telecky, Jr.

(57) ABSTRACT

An apparatus for controlling output signals at an output locus of a power converting device has a rectifier coupled to receive an input signal and present a rectified input signal for switching connection with one of a first and a second network. The first network includes the rectifier. The second network includes part of the first network and the output locus. The networks establish a return current to the rectifier. The apparatus includes: (a) a current indicating unit coupled with the output locus for combining an extant output signal with a time-integrated signal to present a calculated current signal; and (b) a comparing unit coupled with the first network and the current indicating unit for receiving the return current. The comparing unit drives the switching connection when the calculated current signal and the return current have a predetermined relationship.

20 Claims, 3 Drawing Sheets

APPARATUS FOR CONTROLLING A POWER FACTOR CORRECTION CONVERTER DEVICE

BACKGROUND OF THE INVENTION

The present invention is directed to control of power conversion devices such as AC-DC voltage converters, and especially to power factor correction converters. Many electronic equipments use a switching power supply device to power internal circuits. Switching power supply devices include power converting circuitry such as voltage converter circuitry. A switching power supply device may be either an AC (alternating current) or a DC (direct current) power supply unit. Either type of power supply unit, AC or DC, itself imposes a non-linear load on a line to which it may be attached. A non-linear load may result in low power factor, low efficiency, harmful electromagnetic interference (EMI) with other electronic equipment or other undesirable effects.

The problems caused by non-linear loads are addressed by harmonic standards proposed for electronic equipment by international agencies. In order to meet such standards, product designers require switching power supplies with appropriate power factor correction converter circuitry. Such power factor correcting (PFC) converters are controlled to reduce harmonics in current drawn by the power supply produce in which they are employed, correct phase of current drawn and make the power supply look like a pure resistor as viewed from AC supply terminals into the power supply.

PFC signal converters are available, but those with higher precision performance require complex control circuitry. Such increased complexity increases costs for producing such PFC signal converters. There are simpler, lower cost solutions that are used in low power, low efficiency applications; i.e., low performance signal converters.

There is a need for a simplified power factor correction (PFC) control apparatus that can be cost-effectively implemented for use with low cost, low power applications without sacrificing performance.

SUMMARY OF THE INVENTION

An apparatus for controlling output signals at an output locus of a power converting device has a rectifier coupled to receive an input signal and present a rectified input signal for switching connection with one of a first and a second network. The first network includes the rectifier. The second network includes part of the first network and the output locus. The networks establish a return current to the rectifier. The apparatus includes: (a) a current indicating unit coupled with the output locus for combining an extant output signal with a time-integrated signal to present a calculated current signal; and (b) a comparing unit coupled with the first network and the current indicating unit for receiving the return current. The comparing unit drives the switching connection when the calculated current signal and the return current have a predetermined relationship.

It is, therefore, an object of the present invention to provide a simplified power factor correction (PFC) control apparatus that can be cost-effectively implemented for use with low cost, low power applications without sacrificing performance.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

One type of system that is used today for effecting power factor control in signal converter devices is an average current mode control system. Average current mode control requires output voltage sensing and internal multiplier and divider circuitry for implementing PFC control loops. As a consequence of these circuitry requirements average current mode control circuits are relatively complex so that a relatively high part count is required.

Figure 1:
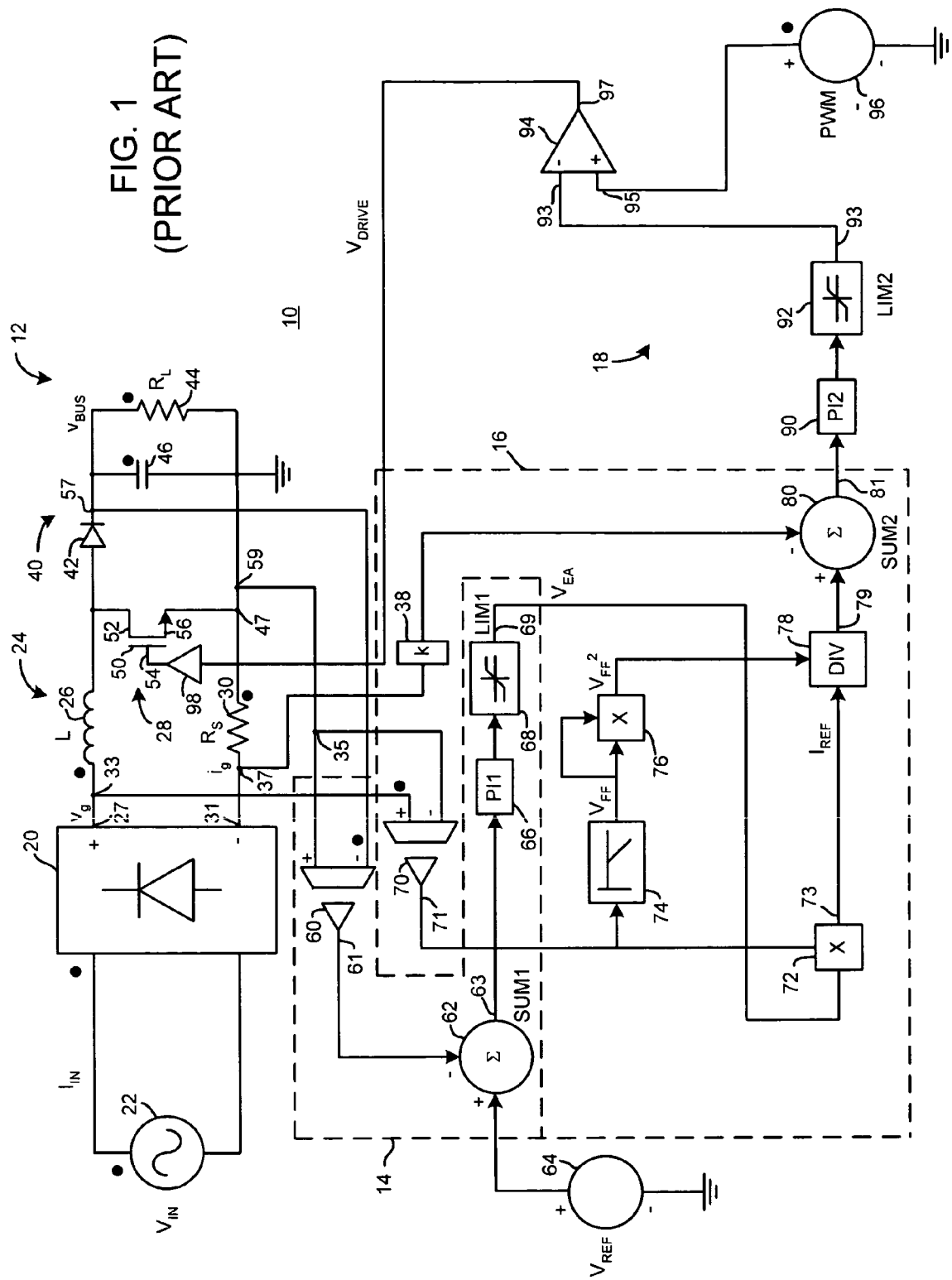
FIG. 1 is an electrical schematic diagram illustrating a prior art apparatus for controlling a power converter device.

FIG. 1 is an electrical schematic diagram illustrating a prior art apparatus for controlling a power converter device. In FIG. 1, a power factor correction (PFC) converting apparatus 10 includes a boost converter device 12, a voltage sensing section 14, a current error section 16 and a switch driving section 18.

Boost converter device 12 includes a rectifying section 20 coupled to receive an alternating current (AC) input signal from an input locus 22. A first network 24 is coupled with rectifying unit 20. First network 24 includes an inductor 26 coupled with a positive output node 27 of rectifying section 20, a switch unit 28 coupled with inductor 26 and a resistor 30 coupled with switch unit 28 and with a negative output node 31 of rectifying section 20. A second network 40 is coupled with first network 24 in parallel relation with switch unit 28. Second network 40 includes a diode 42 coupled with inductor 26. A load (represented in FIG. 1 as a load resistor 44 having a value of $R_L$) and a capacitor 46 are parallel-connected between diode 42 and a circuit locus 47 commonly coupled with switch unit 28 and resistor 30.

A preferred embodiment of switch unit 28 is a NPN transistor 50 having a source 52, a gate 54 and a drain 56. Source 52 is coupled with inductor 26 and diode 42. Drain 56 is coupled with circuit locus 47.

Voltage sensing section 14 is coupled at circuit loci 57, 59 for receiving indication of output voltage across load resistor 44. Voltage sensing section 14 includes a gain block 60 coupled with circuit loci 57, 59. Gain block 60 presents an output indicating signal at an output locus 61 representing output voltage across load resistor 44. A summing unit 62 combines the output indicating signal from output locus 61 with a reference voltage $V_{REF}$ received from a reference voltage source 64. Summing unit 62 presents a voltage error signal at an output locus 63 representing a difference between output voltage across load resistor 44 and reference voltage $V_{REF}$. The voltage error signal is received by a first proportional and integrating regulator (PI1) unit 66. PI1 unit 66 cooperates with a first limiter unit (LIM1) 68 to present a voltage error amplified signal $V_{EA}$ at a circuit locus 69.

Current error section 16 includes a gain block 70 coupled with circuit loci 33, 35. Gain block 70 presents an output signal at an output locus 71 representing rectified AC input voltage $V_g$. Current error section 16 also includes a multiplier unit 72, a low pass filter 4, a squaring unit 76, a divider unit 78 and a summing unit 80. Multiplier unit 72 receives voltage error amplified signal $V_{EA}$ and receives the output signal from output locus 71. Multiplier unit 72 presents a multiplier output signal at an output locus 73 representing the product of amplified signal $V_{EA}$ and rectified AC input voltage $V_g$. Low pass filter 74 also receives the output signal from output locus 71. Low pass filter 74 presents a filtered output signal $V_{FF}$ at an output locus 75. Squaring unit 76 squares filtered output signal $V_{FF}$ and presents a signal $V_{FF}^2$ at an output locus 77. Divider unit 78 divides the multiplier output signal from output locus 73 by signal $V_{FF}^2$ received from output locus 77 to present a signal $I_{REF}$ at an output locus 79. Signal $I_{REF}$ represents the current that is desired returning to rectifying section 20 at a circuit locus 37. Summing unit 80 receives signal $I_{REF}$ from output locus 79 and receives a signal $I_G$ from circuit locus 37 via a scaling unit 38. Signal $I_G$ represents extant rectified AC current returning to rectifying unit 20 at circuit locus 37. Summing unit 80 presents a current error signal $I_{ERROR}$ at an output locus 81. Signal $I_{ERROR}$ represents a difference between extant current $I_G$ at circuit locus 37 and desired current returning to rectifying unit 20.

Switch driving section 18 includes a second proportional and integrating regulator (PI2) unit 90. PI2 unit 90 cooperates with a second limiter unit (LIM2) 92 to present a scaled current error signal $I_{SCALED}$ at a circuit locus 91. Comparing unit 94 receives scaled current error signal $I_{SCALED}$ at an inverting input 93. Comparing unit 94 receives a periodic signal PWM at a non-inverting input 94 from a periodic signal source 96. Comparing unit 94 presents a drive signal $V_{DRIVE}$ at an output locus 97 when signals appearing at inputs 93, 94 have a predetermined relationship. Drive signal $V_{DRIVE}$ is presented to gate 54 via a buffer 98. Drive signal $V_{DRIVE}$ controls switch unit 28 by intermittently applying a gating signal to gate 54 to render switch unit 20 conductive. Drive signal $V_{DRIVE}$ is timed vis-à-vis periodic signal PWM to cancel reactive and harmonic currents so that resulting total current drawn from input locus 22 is substantially free of harmonic or reactive components, such as a case in which resulting total current drawn from input locus 22 is substantially sinusoidal.

As mentioned earlier herein, average current mode control circuitry in signal conversion devices such as boost converter device 10 requires output voltage sensing and internal multiplier and divider circuitry for implementing PFC control loops. As a consequence of these circuitry requirements average current mode control circuits are relatively complex so that a relatively high part count is required. Increased part count and complexity generally translates to higher cost so that such control circuits are employed in high cost, high power signal converter apparatuses. PFC signal converters using such an average current mode control system usually operate in a continuous conduction mode (CCM) and yield higher performance. Multiplier and divider circuit blocks used in CCM converters are sensitive to electromagnetic noise and make control implementation more complicated. This is another reason that such average current mode control systems are not used for low cost PFC converter apparatuses. Lower cost lower performance converter apparatuses typically operate in a discontinuous conduction mode (DCM). DCM signal converter apparatuses have lower efficiency and are employed in lower power products as compared with CCM signal converter apparatuses.

The present invention provides a simplified power factor correction (PFC) control apparatus that can be cost-effectively implemented for use with low cost, low power applications without sacrificing performance. A reduced part count as compared with prior art apparatuses contributes to increased efficiency, lower cost and smaller die space requirements in the present invention.

Figure 2:
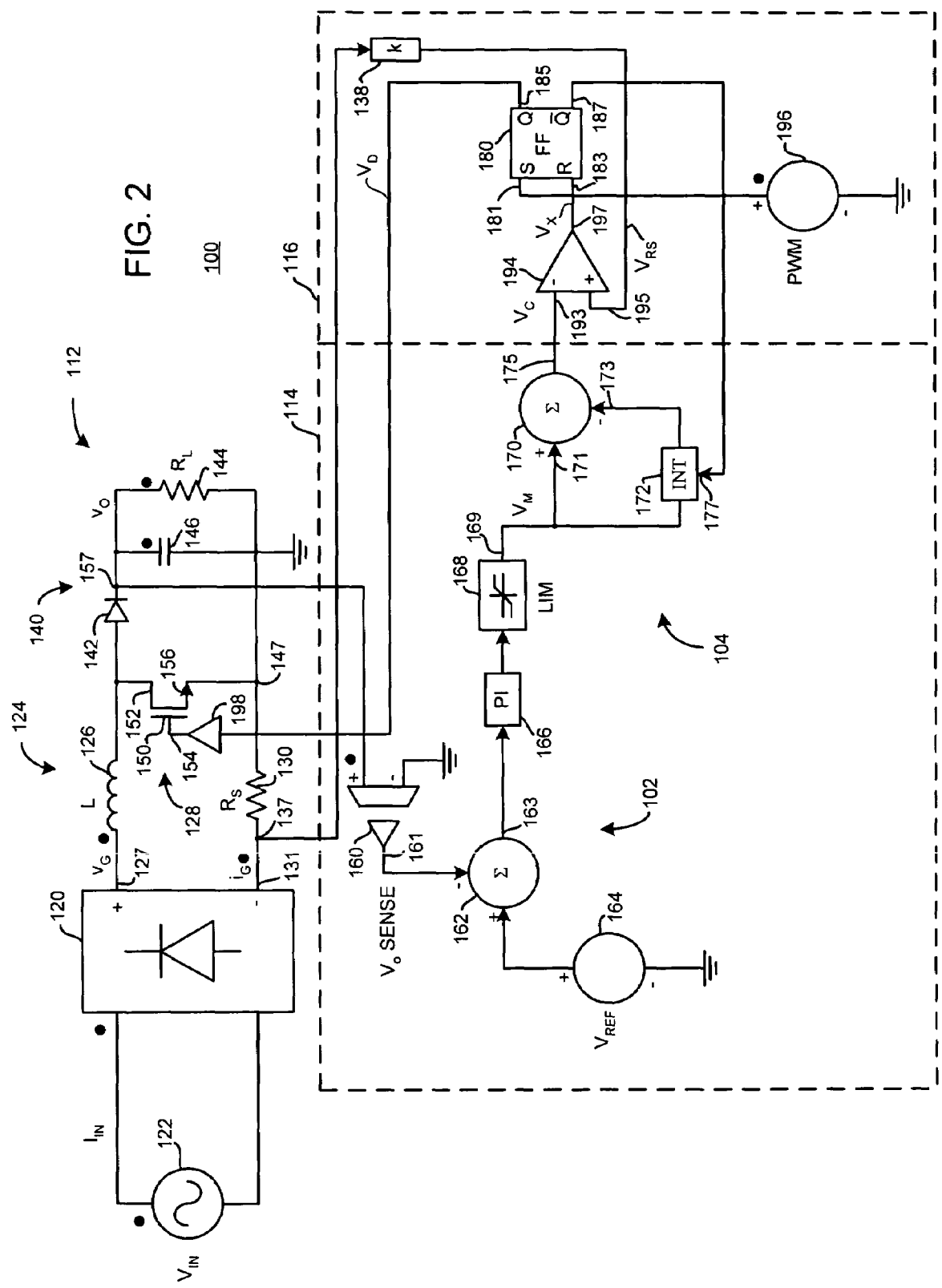
FIG. 2 is an electrical schematic diagram illustrating an apparatus for controlling a power converter device configured according to the teaching of the present invention.

FIG. 2 is an electrical schematic diagram illustrating an apparatus for controlling a power converter device configured according to the teaching of the present invention. In FIG. 2, a power factor correction (PFC) converting apparatus 100 includes a boost converter device 112, a current indicating unit 114 and a comparing unit 116.

Boost converter device 112 includes a rectifying section 120 coupled to receive an alternating current (AC) input signal from an input locus 122. A first network 124 is coupled with rectifying unit 120. First network 124 includes an inductor 126 coupled with a positive output node 127 of rectifying section 120, a switch unit 128 coupled with inductor 126 and a resistor 130 coupled with switch unit 128 and with a negative output node 131 of rectifying section 120. A second network 140 is coupled with first network 124 in parallel relation with switch unit 128. Second network 140 includes a diode 142 coupled with inductor 126. A load (represented in FIG. 2 as a load resistor 144 having a value of $R_L$) and a capacitor 146 are parallel-connected between diode 142 and a circuit locus 147 commonly coupled with switch unit 128 and resistor 130.

A preferred embodiment of switch unit 128 is a NPN transistor 150 having a source 152, a gate 154 and a drain 156. Source 152 is coupled with inductor 126 and diode 142. Drain 156 is coupled with circuit locus 147.

Current indicating unit 114 includes a voltage error sensing unit 102 and an error control unit 104. Voltage error sensing unit 102 includes a gain block 160, a summing unit 162, a proportional and integrating regulator (PI) unit 166 and a limiter unit (LIM) 168. Gain block 160 is coupled at circuit locus 157 for receiving indication of output voltage $V_O$ across load resistor 144. Gain block 160 presents an output indicating signal $V_O$ SENSE at an output locus 161 representing output voltage $V_O$ across load resistor 144. Summing unit 162 combines output indicating signal $V_O$ SENSE from output locus 161 with a reference voltage $V_{REF}$ received from a reference voltage source 164. Summing unit 162 presents a voltage error signal at an output locus 163 representing a difference between output voltage $V_O$ across load resistor 144 and reference voltage $V_{REF}$. The voltage error signal is received by proportional and integrating regulator (PI) unit 166. PI unit 166 cooperates with limiter unit (LIM) 168 to present a voltage error controlled signal $V_M$ at a circuit locus 169.

Error control unit 104 includes a summing unit 170 and an integrator unit 172. Voltage error controlled signal $V_M$ is provided to summing unit 170 at a positive summing node 171 and is also provided to integrator unit 172. Integrator unit 172 integrates voltage error controlled signal $V_M$ with respect to time and provides a time-integrated voltage error controlled signal $\int V_M dt$ to summing unit 170 at a negative summing node 173. Summing unit 170 presents a signal $(V_M - \int V_M dt)$ at an output locus 175.

Comparing unit 116 includes a comparing device 194 and a flip-flop device 180. Comparing device 194 receives signal $(V_M - \int V_M dt)$ (indicated as signal $V_C$ in FIG. 2) at an inverting input 193. Signal $V_C$ represents current desired to be returning to rectifying unit 120 at circuit locus 137. Comparing device 194 receives a signal $V_{RS}$ from circuit locus 137 via a scaling unit 138 at a non-inverting input 195. Signal $V_{RS}$ represents extant rectified AC current returning to rectifying unit 120 at circuit locus 137. Comparing device 194 presents an output signal $V_X$ at an output locus 197 when signals received at inputs 193, 195 have a predetermined relationship.

Flip-flop device 180 receives signal $V_X$ at a RESET input locus 183. Flip-flop device 180 receives a periodic signal PWM at a SET input locus 181 from a periodic signal source 196. Flip-flop device 180 presents an output signal at an inverted output $\bar{Q}$ locus 187. Inverted output $\bar{Q}$ locus 187 is coupled with a reset locus 177 for integrator unit 172. Flip-flop device 180 presents a drive signal $V_D$ at a non-inverted output Q locus 185. Drive signal $V_D$ is presented to gate 154 via a buffer 198. Drive signal $V_D$ controls switch unit 128 by intermittently applying a gating signal to gate 154 to render switch unit 120 conductive. Drive signal $V_D$ is timed vis-à-vis periodic signal PWM to cancel reactive and harmonic currents so that resulting total current drawn from input locus 122 is substantially free of harmonic or reactive components, such as a case in which resulting total current drawn from input locus 122 is substantially sinusoidal.

The objective for control effected by current indicating unit 114 and comparing unit 116 in operation with boost converter device 112 is:

$$I_G = I_L = \frac{V_G}{R_E} \quad [1]$$

Where,
$I_G$ is rectified input current;
$I_L$ is average inductor current over a switching period;
$V_G$ is rectified AC input voltage; and
$R_E$ is emulated resistance of boost converter device 112.

Multiplying expression [1] by $R_S$:

$$I_L \cdot R_S = \frac{R_S \cdot V_G}{R_E} \quad [2]$$

Where,
$R_S$ is current sense resistance.

For a boost converter in CCM (continuous conduction mode) operation with output voltage regulated at voltage $V_O$, the ideal quasi-steady state duty ratio d satisfies the equation:

$$V_G = V_O(1-d) \quad [3]$$

Substituting expression [3] into expression [2]:

$$I_L \cdot R_S = \frac{R_S \cdot V_O}{R_E}(1-d) \quad [4]$$

A voltage comparator with a reference voltage $V_C$ can be used to determine the duty ratio d in each switching cycle. Note that the switching cycle is related to the periodic signal (periodic signal source 196; FIG. 2) and is preferably a pulse width modulating (PWM) signal used to regulate operation of boost converter device 112. Periodic signal PWM is preferably at a significantly higher frequency than line frequency of input signal $V_{IN}$ provided at input locus 122 (FIG. 2). Transistor 150 is turned on (i.e., rendered conductive) at a predetermined point in each switching cycle (i.e., cycle of periodic signal PWM) and turned off when the signal proportional to average inductor current IL (i.e., signal $V_{RS}$; FIG. 2) reaches reference value $V_C$. The reference value $V_C$ is given by:

$$V_C = I_L \cdot R_S \quad [5]$$

Substituting expression [4] into expression [5]:

$$V_C = \frac{R_S \cdot V_O}{R_E}(1-d) \quad [6]$$

Therefore:

$$V_C = V_M(1-d) \text{ Where, } V_M = \frac{R_S \cdot V_O}{R_E} \quad [7]$$

Figure 3:
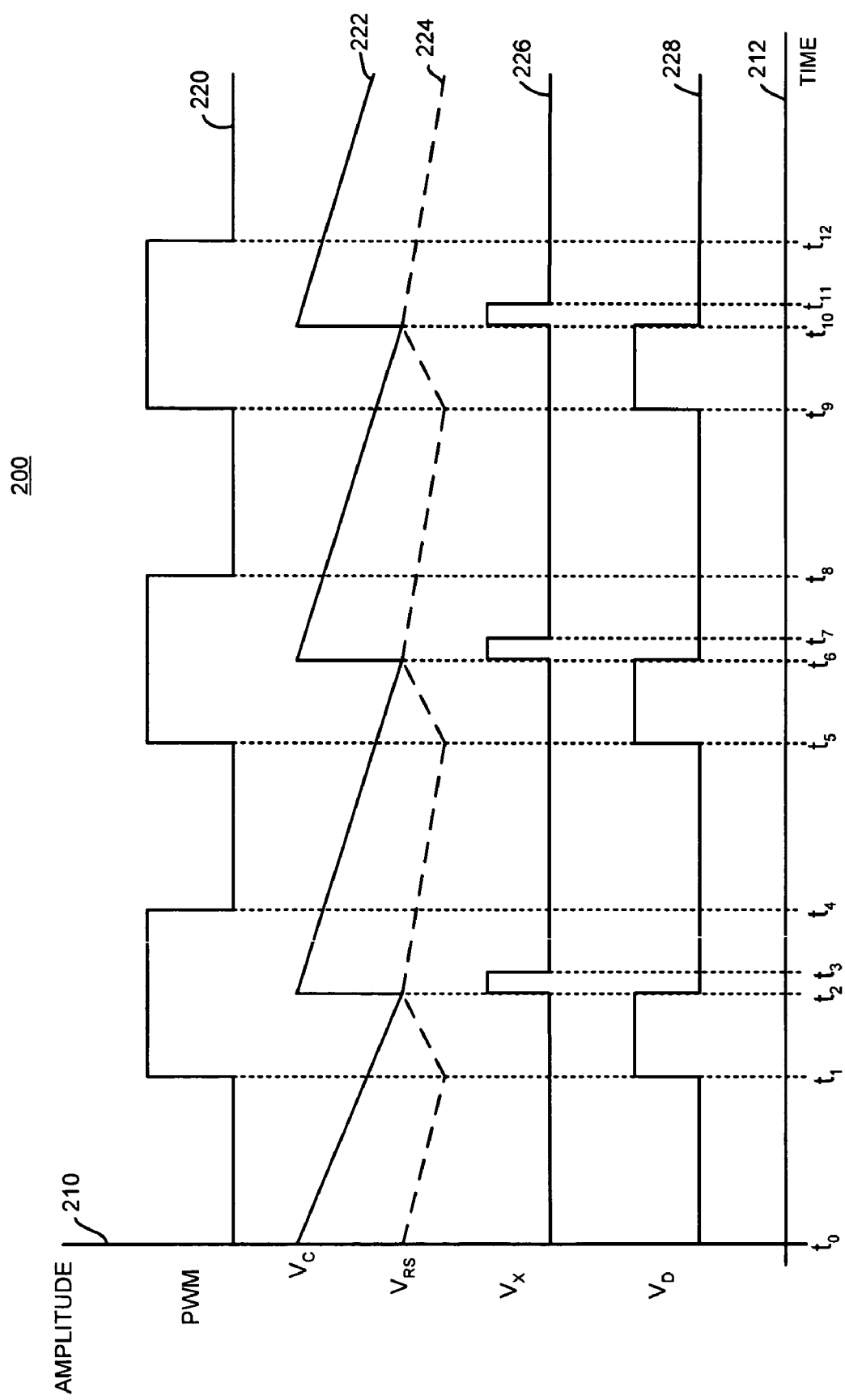
FIG. 3 is a graphic depiction of various waveforms appearing in the apparatus illustrated in FIG. 2.

FIG. 3 is a graphic depiction of various waveforms appearing in the apparatus illustrated in FIG. 2. In FIG. 3, a graphic plot 200 is presented with respect to a vertical axis 210 representing signal amplitude and a horizontal axis 212 representing time. A curve 220 represents periodic signal PWM. Periodic signal PWM is provided by periodic signal source 196 (FIG. 2). A curve 222 represents reference signal $V_C$ indicating current desired to be returning to rectifying section 120 at circuit locus 137 (FIG. 2). A curve 224 represents signal $V_{RS}$ indicating extant rectified AC current returning to rectifying section 120 at circuit locus 137 (FIG. 2). A curve 226 represents signal $V_X$ indicating an output signal at output locus 197 of comparing device 194 (FIG. 2). A curve 228 represents signal $V_D$ indicating a drive signal presented to gate 154 via buffer 198 (FIG. 2).

Regarding FIGS. 2 and 3 together, at time $t_0$, signal $V_C$ representing desired return current to rectifying unit 120 is greater than signal $V_{RS}$ indicating extant current at circuit locus 137, signal $V_X$ output from comparing unit 194 is low and drive signal $V_D$ is low. NPN transistor 150 responds to a low drive signal $V_D$ at gate 154 by not conducting and second network 140 is included in a circuit with rectifying unit 120.

At time $t_1$, periodic signal PWM goes high. A high signal is thereby applied to SET input locus 181 of flip-flop device 180 and output signal Q goes high at non-inverted output Q locus 185 and a high drive signal $V_D$ is presented at gate 154. NPN transistor 150 responds to a high drive signal $V_D$ at gate 154 by conducting and second network 140 is not included in a circuit with rectifying unit 120. When NPN transistor 150 conducts, signal $V_{RS}$ indicating extant current at circuit locus 137 begins to rise.

At time $t_2$, signal $V_C$ and signal $V_{RS}$ are equal. As a result, comparing device 194 presents a high output signal $V_X$ at output locus 197 for presentation at RESET locus 183 of flip-flop device 180 so that output signal Q goes low and inverted output signal $\bar{Q}$ goes high. Output signal Q going low causes drive signal $V_D$ to go low. NPN transistor 150 responds to a low drive signal $V_D$ at gate 154 by not conducting so that second network 140 is included in a circuit with rectifying unit 120 and signal $V_{RS}$ indicating extant current at circuit locus 137 begins to drop.

Flip-flop device 180 presents a high inverted output signal $\bar{Q}$ to reset locus 173 to reset integrator 172 at time $t_2$. Resetting integrator 172 causes signal $V_C$ to rise because a zero signal is now applied to negative summing node 173 of summing unit 170. Output signal $V_X$ goes low at time $t_3$ because signal $V_C$ is greater than signal $V_{RS}$. Periodic signal PWM goes low at time $t_4$.

Time intervals $t_5$–$t_8$ and $t_9$–$t_{12}$ each substantially repeats the events described above with respect to time interval $t_1$–$t_4$. In the interest of avoiding prolixity those events will not be repeated here.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for controlling a switch module for effecting switched connection of an output locus with a rectifying module in a boost power converting device; said power converting device presenting an output signal at said output locus; the apparatus comprising:
    (a) a voltage error sensing unit coupled with said output locus; said voltage error sensing unit generating a voltage error signal representing a first difference between said output signal and a desired output signal;
    (b) an error conversion unit coupled with said voltage error sensing unit; said error conversion unit combining said voltage error signal with an integral of said voltage error signal to generate a calculated current signal; said calculated current signal indicating a calculated return current to said rectifying module; a periodic signal being employed for resetting said integral;
    (c) a comparing unit coupled with said error conversion unit and coupled with a current sampling locus in said power converting device for receiving a sample current; said comparing unit generating a drive signal when said calculated current signal and said sample current have a predetermined relationship; said drive signal controlling said switch module.

2. An apparatus for controlling a switch module for effecting switched connection of an output locus with a rectifying module in a boost power converting device as recited in claim 1 wherein said periodic signal is a pulse width modulation signal for regulating operation of said power converting device.

3. An apparatus for controlling a switch module for effecting switched connection of an output locus with a rectifying module in a boost power converting device as recited in claim 1 wherein said integral is effected as an integral with respect to time.

4. An apparatus for controlling a switch module for effecting switched connection of an output locus with a rectifying module in a boost power converting device as recited in claim 3 wherein said resetting said integral effects a resetting to zero.

5. An apparatus for controlling a switch module for effecting switched connection of an output locus with a rectifying module in a boost power converting device as recited in claim 2 wherein said integral is effected as an integral with respect to time.

6. An apparatus for controlling a switch module for effecting switched connection of an output locus with a rectifying module in a boost power converting device as recited in claim 5 wherein said resetting said integral effects a resetting to zero.

7. An apparatus regulating a boost power converter device; said power converter device responding to a switching signal for switchingly effecting intermittent coupling of a rectified signal from a rectifier unit with an output locus to present a regulated output voltage at said output locus; the apparatus comprising:
    (a) a voltage error sensing unit coupled with said output locus; said voltage error sensing unit generating a voltage error signal representing a difference between an extant output voltage at said output locus and a desired output voltage at said output locus;
    (b) a current calculating unit coupled with said voltage error sensing unit; said current calculating unit summing said voltage error signal with a time-integrated signal to generate a calculated current signal; said calculated current signal indicating a calculated return current to said rectifier unit;
    (c) a comparing unit coupled with said current calculating unit and coupled with said power converter device for receiving an actual return current; said comparing unit presenting said switching signal when said calculated current signal and said actual return current have a predetermined relationship.

8. An apparatus regulating a boost power converter device as recited in claim 7 wherein said time-integrated signal is said voltage error signal integrated with respect to time.

9. An apparatus regulating a boost power converter device as recited in claim 7 wherein said time-integrated signal is periodically reset according to a periodic signal.

10. An apparatus regulating a boost power converter device as recited in claim 9 wherein said periodic signal is a pulse width modulation signal for regulating operation of said power converter device.

11. An apparatus regulating a boost power converter device as recited in claim 8 wherein said time-integrated signal is periodically reset according to a periodic signal.

12. An apparatus regulating a boost power converter device as recited in claim 10 wherein said time-integrated signal is said voltage error signal integrated with respect to time.

13. An apparatus regulating a boost power converter device as recited in claim 12 wherein said periodic signal is a pulse width modulation signal for regulating operation of said power converter device.

14. An apparatus for controlling output signals at an output locus of a power converting device; said power converting device including a rectifying unit coupled to receive an input signal and present a rectified input signal for switching connection with one of a first network and a second network; said first network including said rectifying unit; said second network including a portion of said first network and said output locus; said first network and said second network cooperating to establish a return current to said rectifying unit; the apparatus comprising:
    (a) a current indicating signal unit coupled with said output locus; said current indicating signal unit combining a voltage signal present at said output locus with a time-integrated signal to present a calculated current signal; and
    (b) a comparing unit coupled with said first network and coupled with said current indicating signal unit for receiving said return current; said comparing unit presenting a drive signal when said calculated current signal and said return current have a predetermined relationship; said drive signal effecting said switching connection.

15. An apparatus for controlling output signals at an output locus of a power converting device as recited in claim 14 wherein said time-integrated signal is said voltage signal integrated with respect to time.

16. An apparatus for controlling output signals at an output locus of a power converting device as recited in claim 14 wherein said time-integrated signal is periodically reset according to a periodic signal.

17. An apparatus for controlling output signals at an output locus of a power converting device as recited in claim 16 wherein said periodic signal is a pulse width modulation signal for regulating operation of said power converting device.

18. An apparatus for controlling output signals at an output locus of a power converting device as recited in claim 15 wherein said time-integrated signal is periodically reset according to a periodic signal.

19. An apparatus for controlling output signals at an output locus of a power converting device as recited in claim 17 wherein said time-integrated signal is said voltage signal integrated with respect to time.

20. An apparatus for controlling output signals at an output locus of a power converting device as recited in claim 14 wherein said time-integrated signal is periodically reset according to a periodic signal.

* * * * *